Patented Nov. 9, 1937

2,098,788

UNITED STATES PATENT OFFICE 2,098,788

LEATHER SUBSTITUTE

Russell Morgan, Drexel Hill, Pa., assignor to E. I. du Pont de Nemours & Company, Wilmington, Del., a corporation of Delaware No Drawing. Application October 31, 1935, Serial No. 47,615

5 Claims. (Cl. 91—68)

This invention relates to fabrics which are coated with rubber containing compositions and to methods of making the same, and especially to fabrics of this general description which have properties similar to light weight leathers, such as the leathers which are used as quarter linings for footwear and for making light weight leather articles.

A leather substitute of this general description has heretofore been made by suitably impregnating with rubber the nap side of a heavily napped woven fabric. For satisfactory appearance and quality, a heavily napped fabric was necessary. Consequently it was necessary to start with a heavy woven fabric in order to obtain a fabric with the required amount of napping and a napped fabric of requisite strength. Furthermore, it is evident that the fabric had to be selected for napping properties as well as for strength. Many base materials which lacked napping properties and others which could be napped but lacked strength when they were given sufficient napping could not be used although they were highly satisfactory base materials in other respects. The napped base material and the described method of manufacture are costly and it is desirable to provide means for utilizing other base materials and other methods of manufacture which are less costly. It is also desirable to provide methods which can be applied to other kinds of base materials whereby leather substitutes with new or improved properties can be made.

This invention has as an object to provide a leather-like material of high strength in which the objections of the prior art material are avoided.

Another object of the invention is to provide a material of the kind described which can be prepared by the use of a woven or unwoven base material without regard to the napping properties of the base material.

Another object of the invention is to provide an improved leather substitute and method of making the same.

These and other objects which will appear in connection with the description of the invention and are accomplished generally by first providing a woven or unwoven sheet base material with an artificial suede surface and then suitably filling the sueded surface with a rubber composition.

By way of illustration but not by way of limitation, the following example is given as an illustrative embodiment of the invention.

Cotton fabric having a square weave and weighing approximately 5⅓ ounces per linear yard and 38 inches wide is impregnated, by any of the usual procedures well known in the art of treating fabrics, with one application of a rubber composition dispersed in a suitable dispersing medium such as gasoline, naphtha or the like. A suitable rubber compound is preferably one which contains substances which give bulk and wear resistance to a dried coating of the compound, such as the following formula:

| | Parts by weight |
|---|---|
| Rubber | 40 |
| Factice (white) | 10 |
| Barytes | 15 |
| Lithopone | 30 |
| Magnesium carbonate | 10 |
| Pigment | 1 |

This composition is prepared according to any of the procedures well known to those skilled in the art of rubber compounding. The compound is dispersed in gasoline to produce a cement having the proper consistency or viscosity for impregnating purposes. A satisfactory ratio of rubber compound to dispersing agent is 1 to 1, although greater or smaller amounts of the dispersing agent may be used, dependent largely upon the viscosity of the so-called cement desired. After the impregnation of the fabric, as noted above, the volatile solvent is removed by any convenient means such as passing over heated coils or thru a suitably heated drying chamber. After drying the impregnated fabric, it is coated on one face with the same kind of composition which is used for the impregnation, but the latter coating material preferably has a higher viscosity rendering it more suitable for coating purposes. It is desirable to apply two applications or coats and the volatile solvent is removed in a manner similar to that noted above. The coated surface is then dusted with potato starch. To the thus prepared surface is applied one coat of an adhesive rubber composition dispersed in gasoline, the viscosity of which is adjusted to make it satisfactory for coating. A composition suitable for attaching fibrous flock to the base material is used for this coating. The formula for one suitable rubber composition for this coating is as follows:

| | Parts by weight |
|---|---|
| Rubber | 75 |
| Rosin | 8 |
| White factice | 20 |
| Mineral oil | 2 |
| Whiting | 3 |

Immediately after the application of the above adhesive composition and before the film has dried, a quantity of undyed cotton flock is dusted on to cover the surface. The volatile solvent is then removed by such means as noted above and the excess or non-adherent cotton flock is removed from the surface by suitable brushes or other convenient means to produce a suede surface. This kind of a surface is referred to herein as an artificial suede surface or an artificially sueded surface.

To the artificially sueded surface are then applied two coats of the same kind of rubber composition that was used to impregnate the fabric. These coats are applied by means of a rounded or dull doctor knife or other suitable arrangement and the fibers of the suede are covered or submerged thereby. The material is then dried to remove the volatile solvent, passed between squeeze rollers to produce uniform thickness and more or less smoothness and finally dusted with potato starch to prevent tackiness. The material is vulcanized by applying sulfur chloride in a solution of carbon tetrachloride to the sueded and coated surface and the excess of sulfur chloride is finally neutralized by passing the material through a chamber where it comes in contact with ammonia fumes.

The squeezing of the material after the sueded surface is filled with the rubber composition serves to give the material a uniform surface finish, thickness and compactness. More or less squeezing can be employed to produce a more or less compact material in imitation of the more or less compact leathers, and the surface of the material may be embossed during the squeezing operation or afterwards to produce any desired pattern or grain. However, the squeezing may be extremely gentle or may be omitted.

The procedure and the use of the compositions described in the illustrative embodiment of my invention have given excellent results but other procedures and rubber compositions having suitable properties can be used. However, it is necessary to use a kind and quality of rubber composition which will cause the suede fibers to securely adhere to the base material and a composition for the spread coat which by one or more applications will fill the sueded surface so that a more or less smooth, bulky, wear-resistant, non-suede surface will result with or without the use of finishing rolls. A large variety of woven or unwoven pliable base materials of variously woven, felted or paper-like structure and of vegetable, animal, or artificial origin can be used, such as cotton goods, rayons, wools, felts, papers and the like of various textures.

Instead of impregnating the base material in producing the sueded surface, I may merely coat the material but one or more impregnations give most excellent results. Many variations in making the sueded material can be employed. An excellent product can be made by using felted or paper-like material as the base material and such a product is contemplated by this invention. Any base material of suitable strength for the purposes intended can be used for the base material upon which the suede surface and the bulky material are disposed. Heat vulcanized rubber compositions of various kinds can be used instead of the compositions described in the foregoing example. Instead of vulcanizing all coatings of rubber at once, the rubber of the artificial suede fabric may be vulcanized first and then the suede may be coated, filled or impregnated and again vulcanized. A part of the rubber composition may be vulcanizable by the dry heat method and a part may be vulcanizable by the acid or the vapor sulphur chloride process. Instead of finishing with a dusting agent, varnish or shellac may be used for the finish coat.

Still other modifications can be made without departing from my invention, and it is to be understood that no limitations are intended except those imposed by the prior art or specifically recited in the appended claims.

I claim:

1. The method of preparing a leather substitute which comprises making an artificially sueded material by disposing a rubber composition on a pliable base material and thereafter flocking the rubberized surface to provide a nap, vulcanizing to securely fix the flock, submerging the nap in a sufficient amount of a coating of a rubber composition which contains fillers to produce a non-sueded surface and to provide a bulky and wear resistant coating, smoothing and vulcanizing the last applied rubber thereby preventing any napping of the flocked surface.

2. The process which comprises impregnating a square weave unnapped cotton fabric weighing 5⅓ ounces per linear yard of 38 inch width with a gasoline dispersion of

| | Parts by weight |
|---|---|
| Rubber | 40 |
| Factice (white) | 10 |
| Barytes | 15 |
| Lithopone | 30 |
| Magnesium carbonate | 10 |
| Pigment | 1 | removing the excess gasoline, coating one surface with a gasoline dispersion of

| | Parts by weight |
|---|---|
| Rubber | 40 |
| Factice (white) | 10 |
| Barytes | 15 |
| Lithopone | 30 |
| Magnesium carbonate | 10 |
| Pigment | 1 | removing the excess gasoline, dusting with potato starch, coating the dusted, coated, impregnated fabric with an adhesive composition consisting of

| | Parts by weight |
|---|---|
| Rubber | 75 |
| Rosin | 8 |
| White factice | 20 |
| Mineral oil | 2 |
| Whiting | 3 | dispersed in gasoline, dusting on the undried coated, dusted, coated, impregnated fabric with a cotton flock to produce an artificial suede surface, removing excess gasoline and flock, coating the artificial suede surface with an amount of a gasoline dispersion of

| | Parts by weight |
|---|---|
| Rubber | 40 |
| Factice (white) | 10 |
| Barytes | 15 |
| Lithophone | 30 |
| Magnesium carbonate | 10 |
| Pigment | 1 | sufficient to submerge the flock and form a fiber free surface, removing the excess gasoline, rolling to produce uniform thickness and smoothness and vulcanizing.

3. Artificial leather material substantially as made by the process of claim 2.

4. The process which comprises impregnating an unnapped fabric with a rubber dispersion containing a filler and free from flock, coating the impregnated fabric with an adhesive rubber composition, applying flock to the adhesive coating, removing the excess flock, submerging the flock and forming a fiber free surface by coating with a rubber dispersion containing a filler and free from flock, smoothing the surface and vulcanizing thereby preventing any napping of the flocked surface.

5. The process which comprises impregnating an unnapped fabric with a rubber dispersion containing a filler, factice and free from flock, coating the impregnated fabric with an adhesive rubber composition containing factice, applying flock to the adhesive coating, removing the excess flock, submerging the flock and forming a fiber free surface by coating with a rubber dispersion containing a filler, factice and free from flock, smoothing the surface and vulcanizing thereby preventing any napping of the flocked surface.

RUSSELL MORGAN.